US005348428A

United States Patent [19]

Turner

[11] Patent Number: 5,348,428

[45] Date of Patent: Sep. 20, 1994

[54] UNDERFLOOR DRILLING JIG AND FRAME

[76] Inventor: Gordon H. Turner, 15 Aylesham Way, Yateley, Surrey, Great Britain

[21] Appl. No.: 934,463

[22] PCT Filed: Mar. 13, 1991

[86] PCT No.: PCT/GB91/00399

§ 371 Date: Sep. 11, 1992

§ 102(e) Date: Sep. 11, 1992

[87] PCT Pub. No.: WO91/13728

PCT Pub. Date: Sep. 19, 1991

[30] Foreign Application Priority Data

Mar. 13, 1990 [GB] United Kingdom ................. 9005678

[51] Int. Cl.[5] ................................ B23B 45/14

[52] U.S. Cl. ................................ 408/99; 408/87; 408/111; 408/136; 408/712

[58] Field of Search ................ 408/87, 92, 99, 100, 408/111, 110, 136, 234, 712

[56] References Cited

U.S. PATENT DOCUMENTS

| | | | |
|---|---|---|---|
| 628,404 | 7/1899 | Forrester | 408/99 |
| 704,657 | 7/1902 | McClellan . | |
| 1,486,933 | 3/1924 | Stoltz et al. | 408/99 |
| 1,517,987 | 12/1924 | Henderson . | |
| 1,750,957 | 3/1930 | Fowler . | |
| 2,291,729 | 8/1942 | Koett | 144/105 |
| 2,466,965 | 4/1949 | Pitts . | |
| 3,060,769 | 10/1962 | Heider . | |
| 4,235,565 | 11/1980 | Albano | 408/99 |
| 4,669,929 | 1/1987 | Olesen | 408/100 |

FOREIGN PATENT DOCUMENTS

| | | | |
|---|---|---|---|
| 3120247A1 | 2/1983 | Fed. Rep. of Germany . | |
| 137811 | 10/1980 | Japan | 408/99 |
| 2102313A | 2/1983 | United Kingdom . | |
| 2176138A | 12/1986 | United Kingdom . | |

*Primary Examiner*—Daniel W. Howell
*Attorney, Agent, or Firm*—MacMillan, Sobanski & Todd

[57] ABSTRACT

An underfloor drilling jig comprises a fixed outer frame 28 and an inner frame which slides within. A standard electric drill 10 is clamped to this inner frame in a vertical position with an angled gear-box 11 attached below. An adjustable lever assembly 16, 18, 30 houses the lever 15 that can be removed via slot 17.

The gear-box 11 is modified by a "blister" 12, which houses the pressure screw and housing 14.

The lever 15 applies pressure to the drill bit 38 via gear-box 11.

Steady-plate 36 holds the chuck 37 steady when drilling.

Jaws 25 of clamp-plate 24 grip the flange of the rolled steel joist 26 when pressure is applied to the lever 15.

Height adjusting screws 22 adjust the height to a horizontal position, but the front one is only necessary when drilling wooden joists.

5 Claims, 5 Drawing Sheets

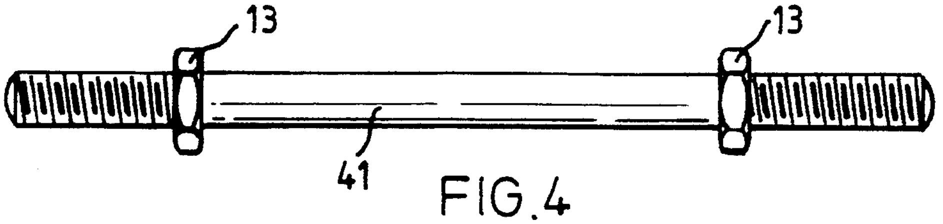
FIG.4
FIG.5
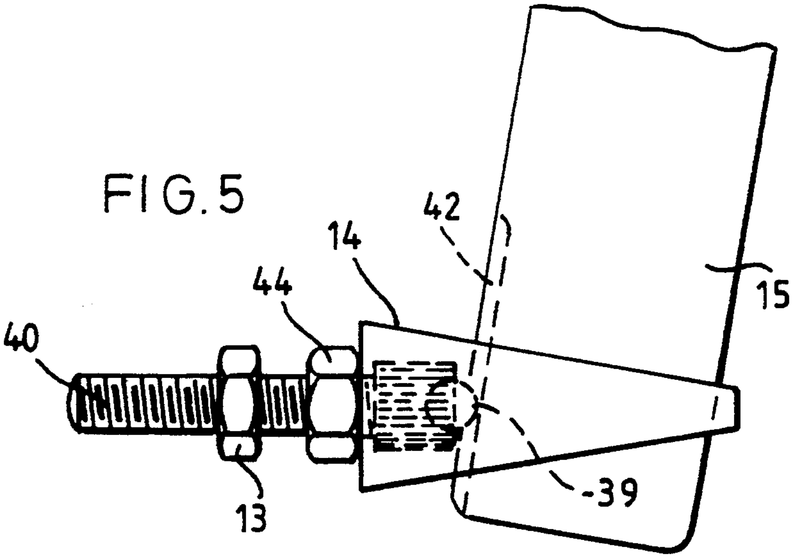
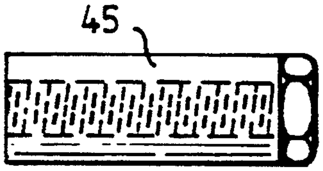
FIG.6
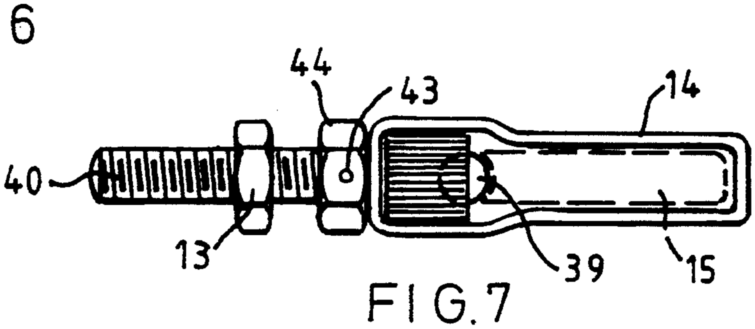
FIG.7
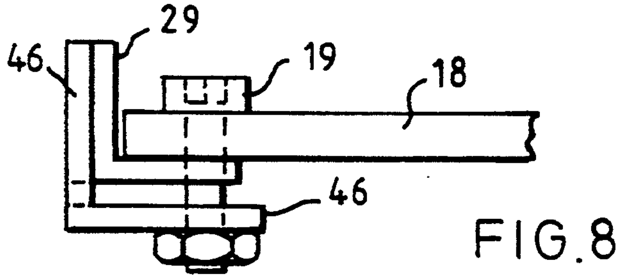
FIG.8

UNDERFLOOR DRILLING JIG AND FRAME

This invention relates to a portable drilling jig and frame for drilling holes in underfloor steel, wood and concrete joists.

When service pipes for gas, electricity, plumbing and central heating have to be installed across wooden joists, it is often common practice to roughly remove a section along the top edge of these joists which drastically weakens them. Furthermore, such pipes can easily be damaged when the floor boards are replaced, or when threshold boards, carpet grippers and carpet tacks are replaced.

When service pipes are installed across rolled steel joists, they are usually laid across the top flange of the joist and the floor boards are cut away to fit around these pipes, which not only weakens the floor boards but leaves the pipes unprotected from flooring nails and carpet grippers and tacks. When electric cables are laid across rolled steel joists they are not protected and can often become chafed and dangerous, and can and do cause fires. Sometimes door thresholds and door frames are cut away as an alternative solution to the problem, but the same disadvantages remain, plus the added weakening of the door frame itself.

The same situation applies when service pipes have to be installed across reinforced concrete joists or lintels.

Thus the present invention provides an underfloor drilling jig and frame comprising a stationary fixed frame with a sliding inner frame, into which is fitted an electric drill and an angled gear-box for coupling to a drill chuck.

We may also claim an underfloor drilling jig and frame comprising a stationary fixed frame with a sliding inner frame configured for receiving an electric drill and an angled gear-box.

In the context of the present invention, the term "angled gear box" means any gearing arrangement which transmits rotational motion through an angle other than 180°.

In a particular embodiment, a standard variable-speed electric drill is clamped in a vertical position in a sliding frame, with a standard 90° gear-box, modified to some extent, attached in a horizontal position. A pressure screw is fitted into the modified part of the gear-box, and a long lever applies pressure to the end of this screw, which is positioned along the line of the axis of the gear-box, which results in a quick and easy method of drilling holes in underfloor joists.

A specific embodiment of the invention will now be described by way of example with reference to the accompanying drawing in which:

FIG. 4 shows the extension rod and lock-nuts for the pressure screw.

FIG. 5 shows a side view of the lever, the pressure screw and lock-nut, the ball-bearing, and metal screw retaining housing.

FIG. 6 shows the threaded connection tube for connecting the pressure screw and the extension rod.

FIG. 7 shows a plan view of the pressure screw, lock-nut, the screw retaining housing, the seelock or pin to retain the nut in the fixed position to enable the pressure screw to be adjusted as required, the ball-bearing and a sectional view of the lever with semi-circular groove, shown actual size.

FIG. 8 shows an end view of the clamping arrangement of the lever assembly, actual size, which includes the right-angled clamping plate, the right-angled lever support bracket member, a sectional view of the lever support bracket and the clamping bolt.

Figure 1:
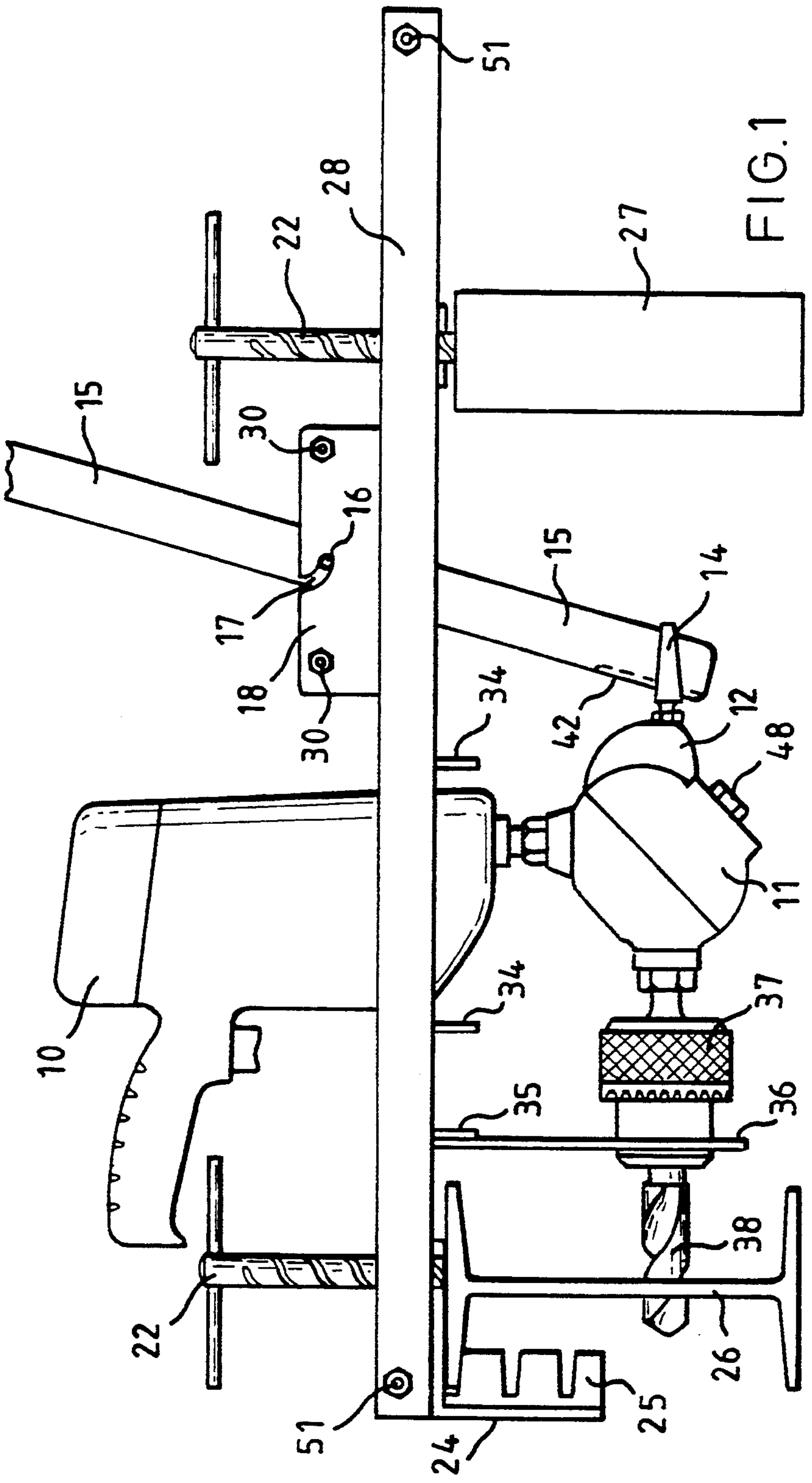
FIG. 1 shows a side view of the main fixed part of the jig, a sectional view of the rolled steel joist being drilled, a wooden joist, the front section three-stage height control jaws, the height control jacking screws, the lever and sliding lever assembly, the electric drill, (minus cable,) the 90° gear-box and the drill-bit.
Figure 2:
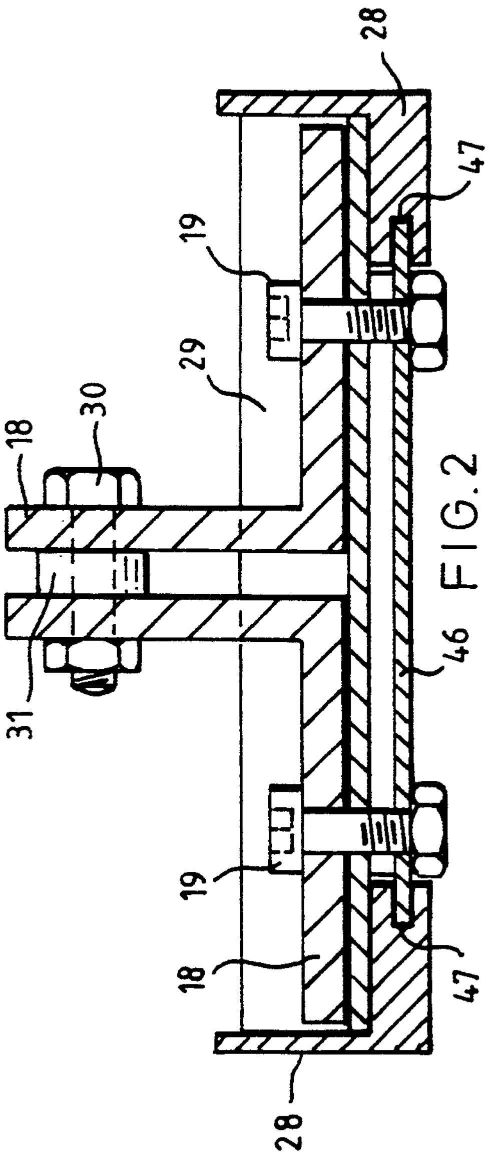
FIG. 2 shows a section view along the line A-AA, looking towards the front of the jig, showing the lever support brackets, the bracket connecting bolt and distance collar, the right-angled section support cross-member, a cross-section of the main fixed part of the jig, and the right-angled clamping plate and clamping bolts, all actual size.
Figure 3:
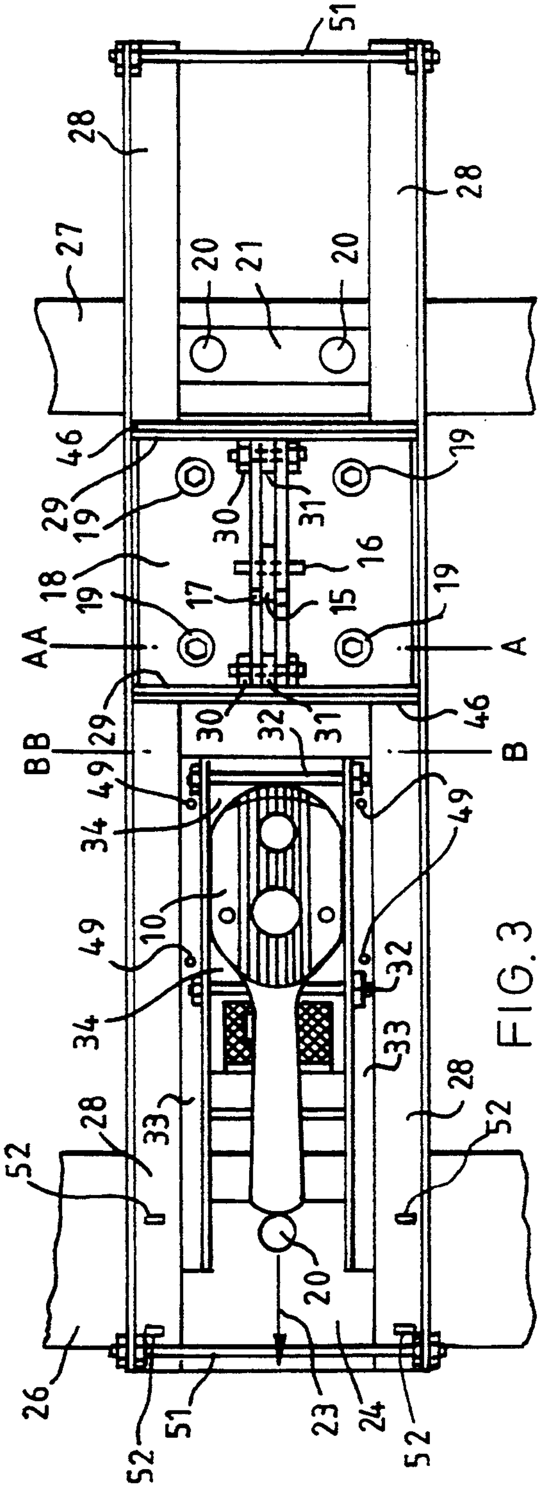
FIG. 3 shows a plan view of the electric drill mounted in the sliding frame, the adjustable lever assembly, the height jacking plate, a section of a wooden floor joist, a section of a rolled steel joist, three jacking screw-holes and the main fixed part of the jig with adjustable tension bolts at each end.
Figure 9:
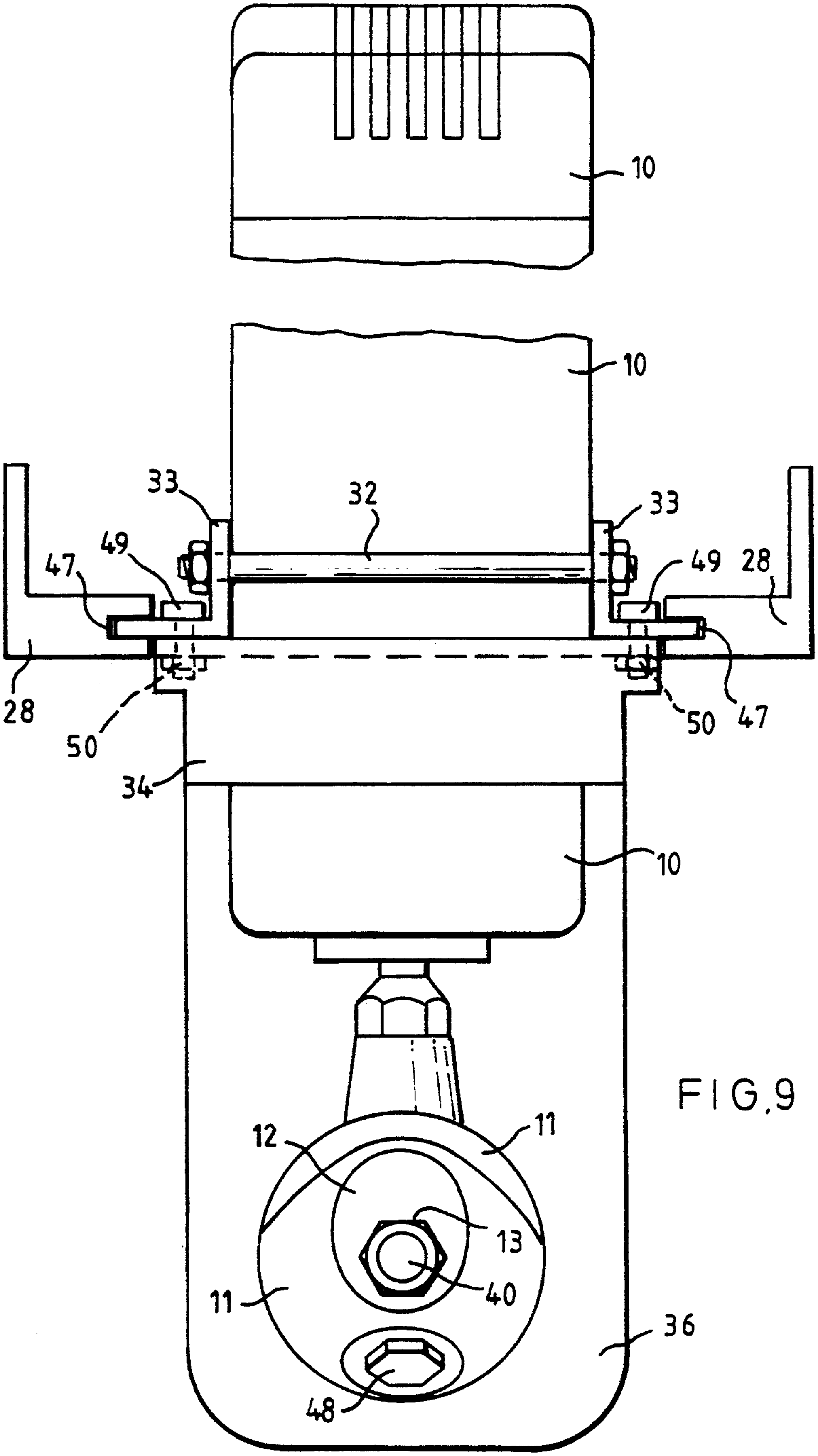
FIG. 9 shows a section view along the line B–BB of FIG. 3, looking towards the front of the jig, showing the electric drill, the clamping bolt and nuts, the fixed and sliding sections of the jig, the right-angled section metal steady plate, the drill drive spindle, the 90° gear-box, the gear-box filler plug, the pressure screw and lock-nut, and the front end drill chuck steady plate.

Referring to the drawings, the underfloor drilling jig comprises a fixed frame 28 with a sliding inner assembly 33 and adjustable lever assembly 18, 19, 29, 30, 31, 46.

A standard variable-speed electric drill 10 is securely held in the sliding frame 33 by means of two bolts 32 and nuts, also two right-angled section steady-plates 34 which are fitted to the contour of the body of the electric drill 10, and engaging in the slots provided for the purpose. Alternatively, the electric drill 10 can be clamped securely into the sliding frame 33 by the means of a collar fitted near the spindle-end of the electric drill 10, depending on the design of the drill used.

The drill-chuck 37 is removed and a standard 90° gear-box 11 is screwed on in its place, the drill-chuck 37 being screwed onto the end of the gear-box 11. The modified "blister" 12 is moulded onto the bottom of the gear-box casing 11 or, alternatively could be attached by a pressed metal clip or bracket, (not shown), bolted onto the filler plug 48 at the bottom of the gear-box 11. The blister 12 houses the threaded pressure screw 40 which can be adjusted by means of the fixed nut 44 to suit the length of the drill 38, in relation to the position of the lever 15. Another alternative would be to redesign the bottom half of the gear-box casing 11 to accommodate the threaded pressure screw 40, in line with the axis of the gear-box spindle. A lock-nut 13 is tightened when the correct position of the pressure screw 40 is achieved, and the lever assembly 18,19,29,30,31,46, is clamped in a position when the drill-bit is just clear of the work and the lever 15 is a little forward of the perpendicular.

When the work to be drilled is the rolled steel joist 26 the height at the front end of the drilling jig can be obtained by engaging the front clamp jaws 25 in one of three positions available, without the need to set the front jacking screw 22, in which case the jacking screw hole 20 can be used to position the jig in the correct lateral position relative to any mark made previously on the surface of the flange of the joist 26. The heavily scribed line and arrow 23 will also be helpful in this respect. At this point the two remaining jacking screws 22 at the rear of the jig can be used to line the jig in a correct horizontal position by firstly setting the jacking plate 21 above the neighbouring joist 27. An alternative arrangement may be to place a length of packing over the floor boards at either side of the jig, if only the three clamp jaw 25 positions are used. Alternatively, the clamp jaws 25 could be bolted onto front end angle clamp 24 through slotted holes, thus allowing an infinite choice of heights, in which case the jacking screw height method would be preferred. A small pilot hole would be drilled at the high speed ratio of the electric drill, followed by larger holes at the low speed. A small bore copper pipe with an adjustable sliding nozzle (not shown) would be fitted, attached to the front drill chuck steady plate 36, which is bolted to the right-angled section member 35, which is itself bolted to the sliding part of the jig 33. The other end of the small bore copper pipe would be attached to a length of small bore flexible plastic pipe (not shown) and a small container with a small on/off stop-cock (not shown.) Two shallow metal or plastic trays, with a magnetic strip along one edge would be placed under the drill bit 38, one each side of the joist 26, and held in place by the magnetic strip, thereby catching the surplus cutting fluid that would flow onto the point of the drill bit 38 throughout the drilling operation (not shown.) An alternative arrangement would be to fit a small electric pump to circulate the cutting fluid, using the metal trays as reservoirs, (not shown).

Since alternative designs of attachments will require differing positions of the hole in the steady plate 36, both horizontally and vertically, it is advantageous to attach the latter to the right-angled section member 35 by means of slotted bolt holes to allow for vertical movement and slotted bolt holes in the sliding inner assembly 33 to allow for horizontal movement.

The lever 15 exerts great pressure upon the ball-bearing 39, making the drilling operation quite easy for the operator. The groove 42 helps to keep the lever 15 central to the axis of the gear-box 11 and drill bit 38, at the same time allowing the ball-bearing 39 to slide freely in the groove 42 as the lever 15 prescribes its path about the fulcrum point 16. The metal housing 14 also helps to keep the lever 15 central to the axis of the gear-box 11 and drill bit 38, at the same time drawing the drill-bit 38 away from the hole when the movement of the lever 15 is reversed. The allen pressure screw 40 can be adjusted by means of the fixed nut 44 which is held in the fixed position by the seelock or pin 43, and when in the required position can be locked in position by the lock-nut 13.

The whole lever assembly 15 16 18 19 29 30 31 46 will slide freely in the groove 47 in the main fixed frame 28 when the clamping bolts 19 are slackened, and can be tightened when the lever assembly 15 16 18 19 29 30 31 46 is in the correct position relative to the drill bit 38.

In some situations the space between the rolled steel joist 26 and the adjacent wooden joist 27 is less than the standard 15" 380 mm., in which case the whole lever assembly 15 16 18 19 29 30 31 46 can be slackened and removed from the end of the main fixed frame 28 and re-positioned on the other side of the wooden joint 27. The extension rod 41 can then be fed through the hole previously drilled in joist 27 and screwed into the blister 12 on the gear-box casing 11. The threaded tube 45, pressure screw 40, lock-nuts 13, lever assembly 15 16 18 19 29 30 31 46 can all be re-assembled in the correct position between the main frame sections 28 and when the lever 15 is in a slightly forward position of the perpendicular, and the point of the drill is just clear of the face of the joist 26 the clamping bolts 19 can be re-tightened and drilling commenced. The pressure on the lever 15 in the lever assembly will always hold the jig tightly gripped onto the joist 26 by the jaws 25 in any of the three height positions of the jaws 25. Jacking screws 22 at the rear of the jig can be screwed into jacking plate 21 through threaded holes 20, when in the correct position over joist 27. It will not be necessary to use the front jacking screw 22 in front hole 20 when drilling rolled steel joist 26.

Although the same procedure can be followed when drilling any wooden joists, in practice it will be found that the drilling can be done quite easily and quickly by removing the lever 15 from the slot 17, and simply pushing on the body of the electric drill 10. As the jaws 25 do not have any effect when resting against the face of wooden joists 27, if the height of the hole desired is either of the two higher ones, then in this case the front jacking screw 22 will be necessary, in conjunction with the two jacking screws 22 at the rear of the jig to set the required height. Alternatively, a packing piece of the required thickness can be placed underneath the jig, across the floor boards, at the front end of the jig and another packing piece at the rear end of the jig.

The same procedure can also be followed when drilling reinforced concrete floor beams, joists or lintels, but it would probably be more satisfactory to have a re-designed gear-box capable of hammer action in the same way as a heavy duty electric drill.

The jig could also be used for drilling steel framed buildings, box-girders or steel door-frames found in tower-blocks and offices, with a modification to allow for an extra clamping device, similar to jaws 25 to the rear of the girder flange, so that the jig would remain securely clamped onto the work in whatever position was required, depending upon the situation of the metal to be drilled, (not shown).

A modification to the power supply could be to connect a branch supply switch attached to the top end of the lever 15 to enable the electric drill 10 and the actual drilling process to be controlled by one hand simultaneously, leaving the other hand free. A two-way switching system, (not shown) would enable the electric drill 10 to be controlled by the normal switch in the handle when drilling wooden joists 27 with the lever removed.

A further modification would be delete the chamfer on the front end of the drill-chuck 37 to enable a ball race to be fitted into the steady plate 36, which would give more support and a longer wearing life to the steady plate 36. An alternative would be a nylon collar fitted into the steady plate 36. (neither of these modifications is shown). The steady plate 36 cannot be fitted further back than shown in FIG. 1 because space has to be left for access for the chuck key.

The two right-angled section steady plates 34 are attached to the sliding part of the jig 33 by means of small allen screws 49 and nuts 50.

The main fixed frame of the jig 28 has adjustable tension rods 51 at each end of the frame 28, the rear end rods having slots 53 for quick release to allow removal of all sliding parts from the main frame 28. The front end angle clamp 24 is bolted to the main frame 28 through four slotted holes 52. These bolts, (not shown,) can be released, together with tension rods 51, to allow lateral adjustment to ensure a good sliding fit between the main frame 28 and all sliding parts of the jig that slide in the groove 47 of the main frame 28.

The fulcrum spindle 16 of the lever 15 is a "pressed fit" into the lever 15, and, when resting at the bottom of the curved slot 17, allows lever 15 to move only in the prescribed arc 54 about its axis. This in turn causes the whole sliding portion of the jig, 10 11 12 13 14 33 34 35 36 37 38 to move to and fro and thus complete the drilling operation. The lever 15, with attached fulcrum spindle 15, can be lifted upwards from the frame via curved slot 17, at the same time being withdrawn from the metal pressure screw housing 14. Care must be taken when replacing the lever 15, as the metal pressure screw housing 14 is free to revolve about the pressure screw 40 when the lever 15 is withdrawn, and the lever 15 must be postioned to slide into the housing 14 as the lever 15 is inserted in a downwards direction between the vertical sides of the lever support brackets 18, with the fulcrum spindle 16 entering the curved slot 17.

In another preferred alternative, the steady plate 36 may be placed just in front of the drill chuck 37, with various sizes of nylon bushes, or collars, not shown, which would fit over the shank of the drill bit 38, and into the steady plate 36. This provides a lower-cost method of supporting the drill than a ball-race fitted onto the front end of the chuck key, at the same time being easily and cheaply replaced.

Figure 10:
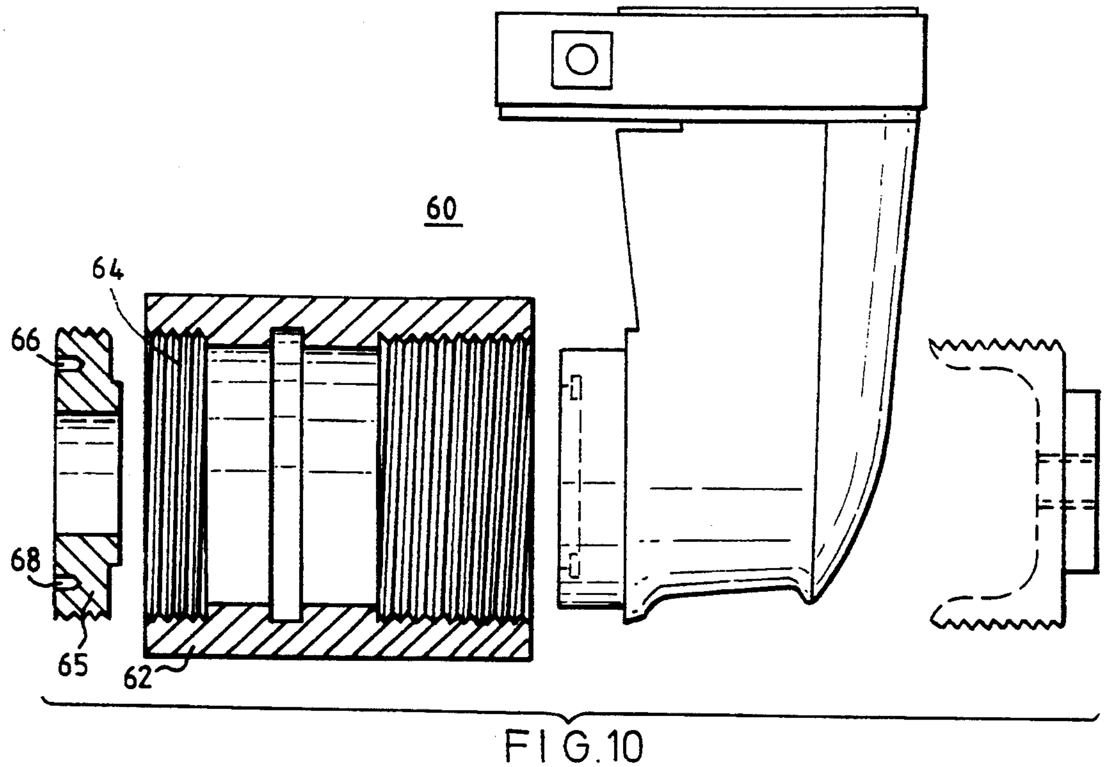
FIG. 10 shows a sectional view of an alternative clamping arrangement.
Figure 11:
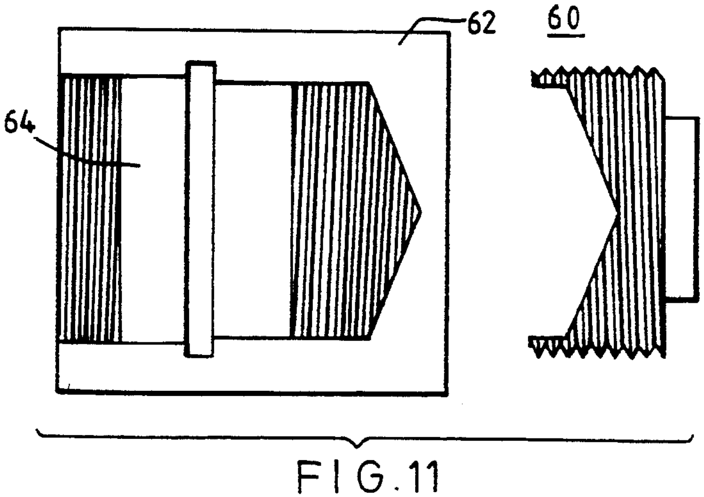
FIG. 11 shows a plan view of the alternative arrangement shown in FIG. 10, after milling.

Referring now to FIGS. 10 and 11, an alternative clamping arrangement 60 for the drill/gear box assembly comprises a housing 62, for example of milled from mild steel standard bar or aluminium. The housing is generally cylindrical and is provided with a slot 64 for receiving the gear box/bit assembly. A retention ring 64 may be provided with small holes 66, 68 for receiving a ring spanner.

I claim:

1. An underfloor drilling jig and frame comprising a stationary fixed frame (28) with a sliding inner frame (33) slidable in a direction of drilling, and a variable speed electric drill (10) fitted in the sliding frame (33), wherein the drill (10) is mounted with its body extending out of the plane of movement of the sliding frame (33), an angled gear box (11) is coupled to the body and carries a chuck (37) whose axis extends in the direction of drilling and a lever (15) pivotally mounted on the stationary frame (28) and arranged to bear along said chuck axis on the gear box (11), drill (10) and sliding frame (33) in the direction of drilling.

2. An underfloor drilling jig and frame comprising a stationary fixed frame (28) with a sliding inner frame (33) slidable in a direction of drilling, and a variable speed electric drill (10) fitted in the sliding frame (33), wherein the drill (10) is mounted with its body extending out of the plane of movement of the sliding frame (33), an angled gear box (11) is coupled to the body and carries a chuck (37) whose axis extends in the direction of drilling and a lever (15) is pivotally mounted on the stationary frame (28) and arranged to bear on the gear box (11), drill (10) and sliding frame (33) in the direction of drilling and wherein the pivotal mounting (18) of the lever is adjustably movable along the stationary frame (28).

3. An underfloor drilling jig and frame comprising a stationary fixed frame (28) with a sliding inner frame (33) slidable in a direction of drilling, and a variable speed electric drill (10) fitted in the sliding frame (33), characterized in that the drill (10) is mounted with its body extending out of the plane of movement of the sliding frame (33), an angled gear box (11) is coupled to the body and carries a chuck (37) whose axis extends in the direction of drilling and a lever (15) is pivotally mounted on and adjustably movable along the stationary frame (28) and arranged to bear on the gear box (11), drill (10) and sliding frame (33) in the direction of drilling, and characterized in that a jaw clamp (24) is provided at a forward end of the stationary frame (28) for gripping a flange of a rolled steel joist (26) as pressure is applied to the lever (15).

4. An underfloor drilling jig and frame comprising a stationary fixed frame (28) with a sliding inner frame (33) slidable in a direction of drilling, and a variable speed electric drill (10) fitted in the sliding frame (33) characterized in that the drill (10) is mounted with its body extending out of the plane of movement of the sliding frame (33), an angled gear box (11) is coupled to the body and carries a chuck (37) whose axis extends in the direction of drilling and a lever (15) is pivotally mounted on the stationary frame (28) and arranged to bear on the gear box (11), drill (10) and sliding frame (33) in the direction of drilling, and characterized in that a jaw clamp (24) is provided at a forward end of the stationary frame (28) for gripping a flange of a rolled steel joist (26) as pressure is applied to the lever (15).

5. An underfloor drilling jig and frame as claimed in claim 4, wherein the jaw clamp (24) is adjustably mounted on the stationary frame (28) to adjust the height of the stationary frame relative to a joist to be drilled.

* * * * *